Sept. 20, 1971     U. FURRER     3,605,632

OVERHEAD CABLEWAY

Filed April 22, 1970     3 Sheets-Sheet 1

INVENTOR.
Ulrich Furrer
BY Dodge & Ostmann
ATTORNEYS

United States Patent Office 3,605,632
Patented Sept. 20, 1971

3,605,632
OVERHEAD CABLEWAY
Ulrich Furrer, Kriens, Switzerland, assignor to Bell
Maschinenfabrik AG, Kriens, Switzerland
Filed Apr. 22, 1970, Ser. No. 30,673
Claims priority, application Switzerland, Apr. 22, 1969,
6,039/69
Int. Cl. B61b 7/10
U.S. Cl. 104—178
5 Claims

ABSTRACT OF THE DISCLOSURE

An overhead cableway with a circulating cable and carriages to be accelerated by a starting device and to be coupled to said circulating cable. With starting a carriage, said starting device being operatively coupled to said circulating cable and moving said carriage. A tensioning device in said starting device for measuring relative movement between said carriage and said circulating cable when the carriage is coupled both to the starting device and to the circulating cable.

BACKGROUND OF THE INVENTION

The invention relates to an overhead cableway, more particularly to a testing apparatus on an overhead cableway for testing the grip on a circulating cable of the clamping mechanisms of carriages adapted to be coupled to the said circulating cable, which overhead cableway comprises a starting device for accelerating the carriages to the speed of the circulating cable, with a starting cart, a starting cable and a traction device, which traction device is adapted to be coupled operatively to the circulating cable and is so constructed that it moves the starting car synchronously with the circulating cable at the end of a starting operation, in which movement state the accelerated carriage is coupled both to the starting cart and to the circulating cable, the testing apparatus having a measuring device for measuring relative movement between carriage and circulating cable.

In the case of overhead cableways having carriages adapted to be coupled to a circulating cable, and which can be constructed as single-cable or double-cable cableways, the problem of synchronising the carriages with the circulating cable before coupling to the said cable has been satisfactorily solved. One example of embodiment of the starting device mentioned initially is described in the Swiss patent specification No. 340,856.

Known testing apparatus for testing the grip of the clamping mechanism of carriages coupled to the circulating cable operate on the principle that an entrainment element intended to act in an accelerating or decelerating sense on a coupled carriage is brought into contact therewith, and the occurrence of any relative movement between carriage and circulating cable is ascertained and interpreted as an inadequate grip. These apparatus have the disadvantage that they considerably disturb the steady running of the circulating cable.

SUMMARY OF THE INVENTION

The invention has as its object to obviate these disadvantages and to provide a testing apparatus wherein outside a short section of the circulating cable in the region of the clamping mechanism no additional longitudinal forces occur and no additional moment acts on the circulating cable. For this purpose a testing apparatus on overhead cableways for testing the grip on a circulating cable of the clamping mechanisms of carriages adapted to be coupled to the said circulating cable, which overhead cableway comprises a starting device of the type initially described, is characterised according to the invention in that a tensioning device is provided for tensioning the starting cable when a carriage is coupled to the circulating cable and also to the starting carriage.

BRIEF DESCRIPTION OF THE DRAWING

One example of embodiment of the invention is shown in simplified manner in the drawings wherein.

DESCRIPTION OF THE PREFERRED EMBODIMENT

Figure 3:
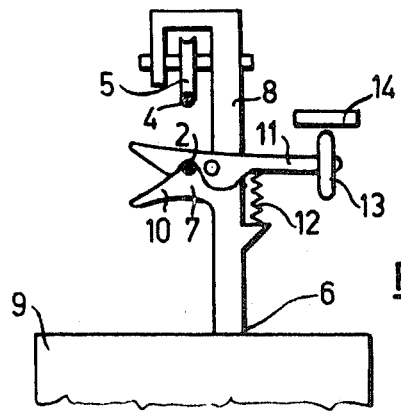
FIG. 3 shows a carriage capable of being coupled-up and FIGS. 4 and 5 show fragmentary views from FIGS. 1 and 2 on a larger scale.
Figure 4:
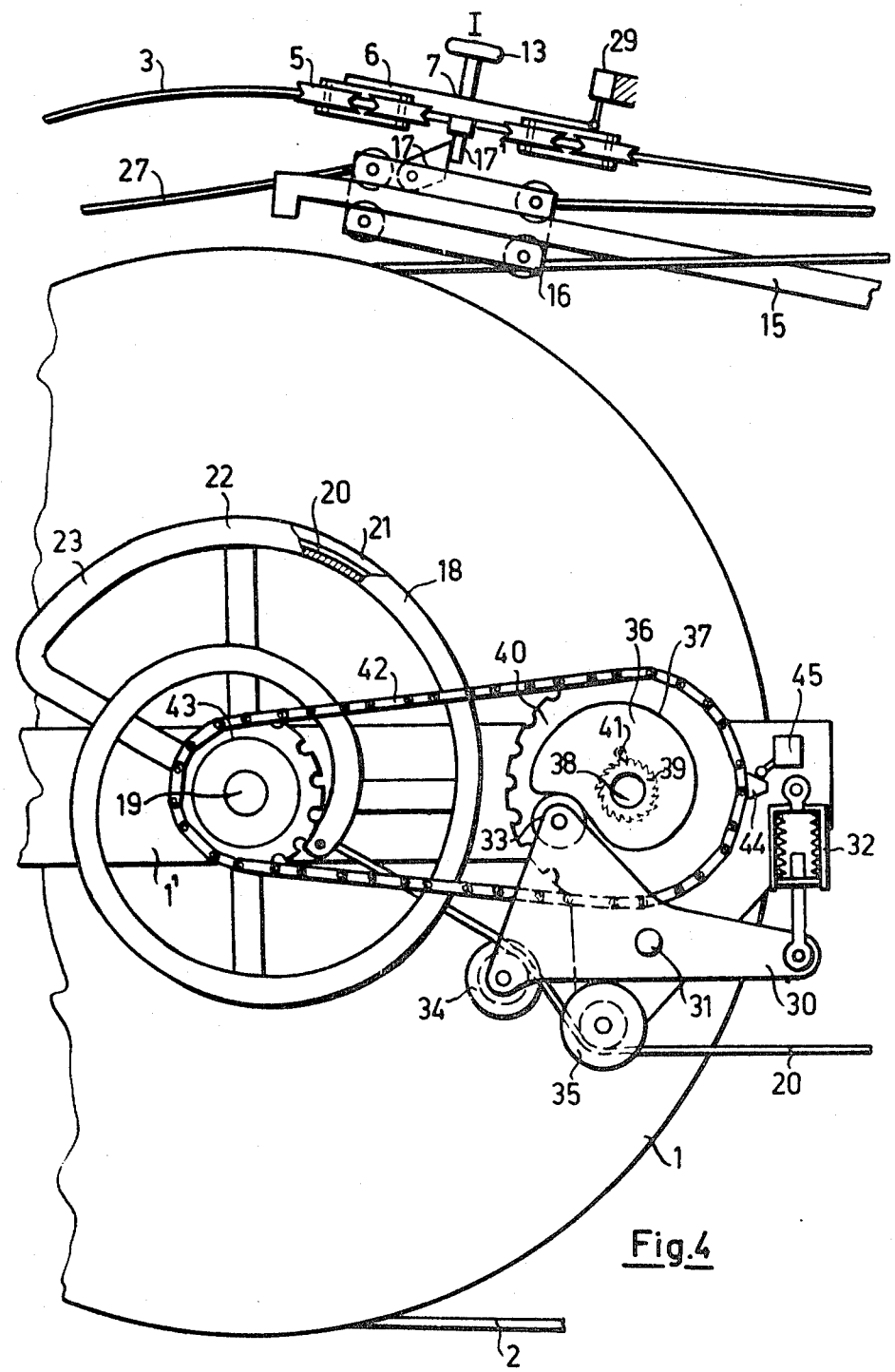
Figure 5:
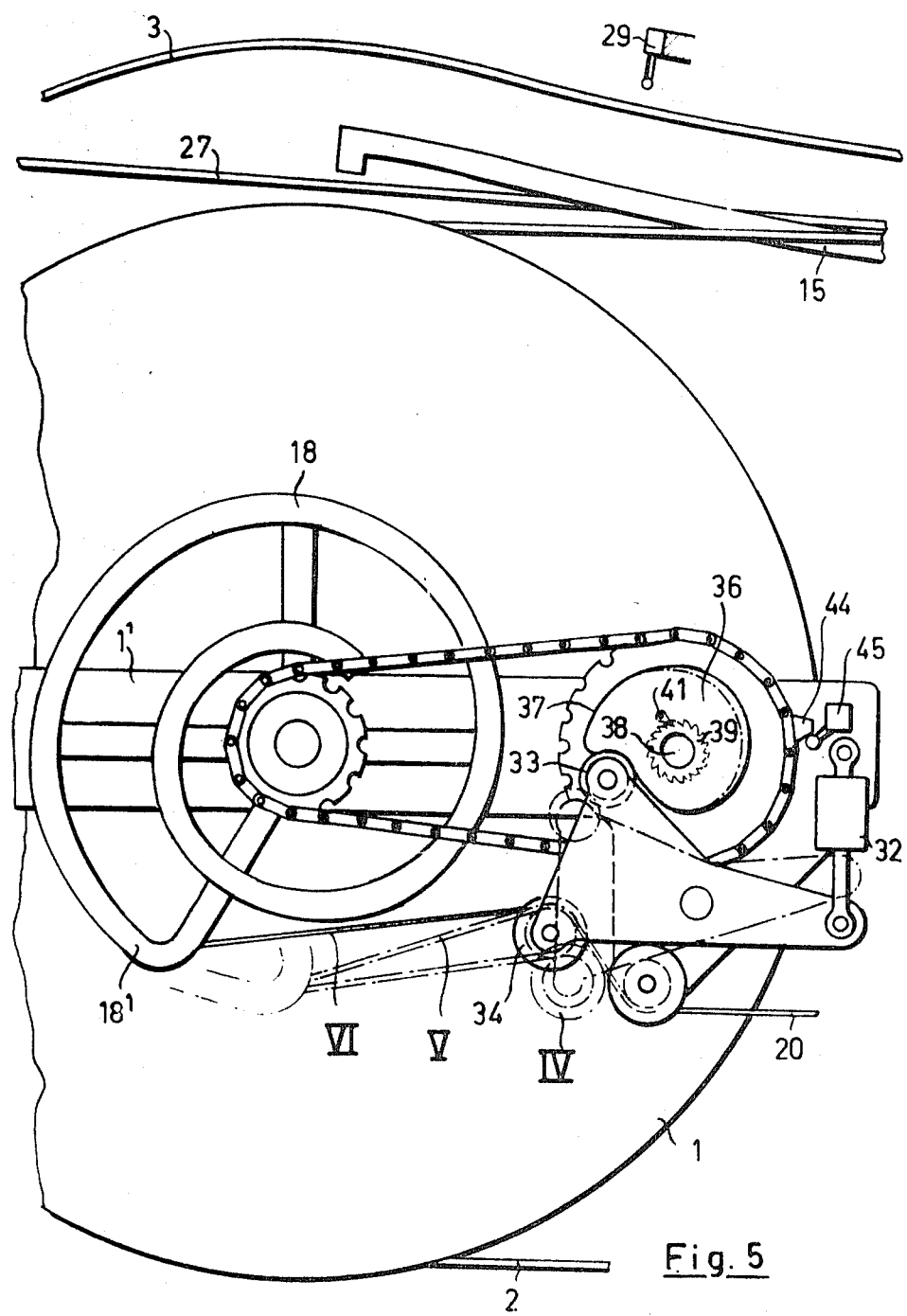

A cable pulley 1 which is mounted in a machine frame $1^1$ and which may be a driving pulley or an end guide pulley, guides a circulating cable 2, through a change of direction of 180°. An overhead rail 3 taken about the cable pulley 1 on the left of the drawings terminates at the right-hand side outside the drawings and is continued there by a carrying cable 4 shown in FIG. 3. Thus the circulating cable 2 is constructed as the haulage cable of a two-cable cableway. However, it is also possible for the illustrated installation, with slight differences, to be a single-cable cableway; in that case the overhead rail 3 would not merge into a carrying cable but into a circulating cable constructed as a carrying and haulage cable.

Figure 1:
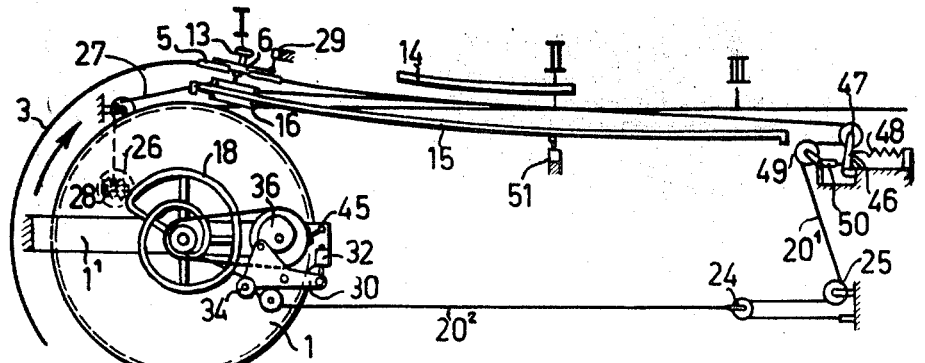
FIGS. 1 and 2 are each a view from above on to a terminal station of a continuous overhead cableway with starting device for carriages adapted to be coupled-up in various operating positions of the starting device.
Figure 2:
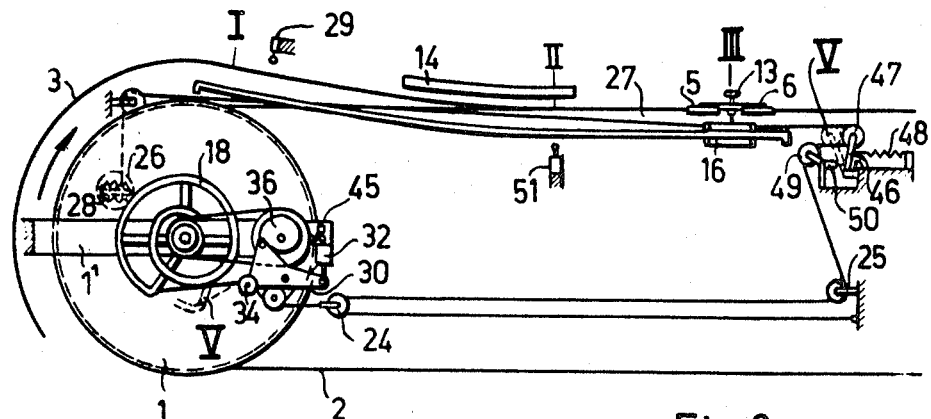

On the overhead rail 3 there travels a four-wheel running gear unit 5 of a carriage 6 which is constructed as an under-cable carriage and which comprises a known clamping mechanism 7 by means of which it can be coupled to the circulating cable 2 extending below the running gear 5. The clamping mechanism 7 is arranged on a suspension yoke 8 which connects the running gear unit 5 to the cable 9. The clamping mechanism 7 comprises a fixed clamping jaw 10 and a pivotable clamping jaw 11, which is held in a clamping position by a spring 12 and is moved into clamping and open positions by a control roller 13 co-operating with a coupling rail 14. Such clamping mechanisms are described in the Swiss patent specifications 263,366 and 317,005, and also in the French patent specification 1,029,650, but their construction is not important. Of the carriage 6, in FIGS. 1 and 2 only the running gear unit 5 is illustrated and a clamping mechanism 7 is indicated by means of a control roller 13. In practice, a carriage comprises two clamping mechanisms and therefore two control rollers.

A starting cart 16 is arranged in mobile manner on a starting rail 15 extending parallel to the overhead rail 3. The running gear unit 5 of the carriage 6 is adapted to be so coupled to the starting cart 16 by means of an overtaking catch 17 of the said starting cart that the starting cart 16 can push the carriage 6 but cannot retain it, the catch 17 co-operating with an abutment $17^1$ on the carriage 6. This simplest coupling device can be used when the friction of the control roller 13 or control rollers on the coupling rail 14 is sufficiently great to prevent the carriage 6 leading, which is usually the case, or if the suspension rail 3 extends slightly upwards. It would also be possible to use another known coupling device which couples the carriage securely in both directions to the starting cart; a coupling device of this kind with a special control rail is described in Swiss patent specification 340,856. However, the construction of this device is of no importance.

Connected to the cable pulley 1 by means of a slip-free electromagnetic dog clutch 19 is a traction device 18 which is coaxial with the said pulley; an example of a mechanical clutch is described in the Swiss patent specification 340,856 where it is shown that the traction device can also be adapted to be coupled in a driving connection fast against rotational movement with an auxiliary pulley which is situated in the vicinity of the cable pulley and is connected operatively to the circulating cable. The traction device 18 and the starting cart 16 are connected to one another by a starting cable 20.

The traction device 18 is constructed in known manner as a rope drum whose rope guide groove 21 has a radial spacing which initially increases steadily and from the point 22 onwards is constant over the section 23, so that the traction device 18 winds the starting cable 20 initially with a steadily increasing speed and at the end at a constant speed. From the point 22 onwards the radial spacing of the cable pulley 21 is so fixed that the starting cable 20 at the point of its connection to the starting cart 16 is at the same speed as the circulating cable when the starting cable 20 is wound by the section 23 of the traction device 18. This is achieved in that the radial spacing of the section 23 of the cable groove 21 of the traction device 18 is adapted to the radius of the cable pulley 1 and any step-up or reduction ratios. In the illustrated example of embodiment the section 23 of the traction device has a radius which amounts to a half of the radius of the cable pulley 1, whereas on the other hand there is interposed in the starting cable a pulley block 24, 25 which doubles the speed of the sector $20^1$ at the starting cart side relatively to that of the sector $20^2$ of the starting cable 20 at the traction device side. The Swiss patent specification 340,856 shows another example of how the starting cart can be synchronised with the circulating cable but these details are not essential. A weight 26 acts by way of a cable 27 and a pulley block 28 on the starting cart 16 in the direction opposite to the direction of travel of the circulating cable 2.

The known starting device described hereinbefore operates as follows. The carriage 6 pushed into the position I on the overhead rail 3 couples itself automatically to the starting cart 16 and operates a switch 29 whereby the clutch 19 is brought into action so that the traction device 18 is made to rotate in the same direction as the cable pulley 1. As a result the section $20^2$ of the starting cable 20 is wound by the traction device 18 at an increasing speed, the section $20^1$ moving the starting cart 16 and the carriage 6 at twice the speed in the direction of travel of the circulating cable 2. The coupling rail 14 actuates the control roller 13 of the clamping mechanism 7, so that the clamping jaws 10, 11 are ready to receive the circulating cable 2. In position II the starting cable has reached the point 22 on the traction device and from there onwards the starting cart 16 and the carriage 6 coupled thereto move synchronously with the circulating cable 2. Immediately after reaching this state, the coupling rail 14 releases the control roller 13 of the clamping mechanism 7, so that the spring 12 presses the clamping jaw 11 against the clamping jaw 10 and thus holds the circulating cable 2 fast between the clamping jaws 10, 11, in other words couples the carriage 6 to the circulating cable 2. The condition wherein the carriage 6 is coupled to the starting cart 16 and at the same time to the circulating cable 2 continues until the carriage has reached position III. On reaching this position III the clutch 19 between the cable pulley 1 and the traction device 18 is disengaged.

The starting device described hereinbefore for an overhead cableway with carriages adapted to be coupled to a circulating cable belongs to the known state of the art. Yet, this starting device is equipped with a testing apparatus for testing the grip of clamping mechanisms 7 of carriages 6 coupled to the circulating cable 2.

The testing apparatus comprises a tensioning device for tensioning the starting cable 20 when the carriage 6 is coupled to the circulating cable 2 and also to the starting cart 16 which state prevails along the distance from position II to position III. This tensioning device has a three-arm lever 30 with a pivot pin 31 fixed relatively to the machine frame $1^1$ and arranged in the vicinity of the traction device 18. An arm situated at the right is connected to a spring 32 whose other end is connected to the machine frame $1^1$. An arm situated at the left in the drawing carries a control pulley 33 and the third arm a tensioning pulley 34 in the vicinity of which there is arranged an idling pulley 35 with its shaft fixed relatively to the machine frame $1^1$. The starting cable 20 travels over the pulleys 34 and 35. A cam wheel 36 with a control cam 37 and a shaft 38 fixed relatively to the machine frame $1^1$ co-operates with the control roller 33. A ratchet wheel 39 is connected fast to the cam wheel 36. Arranged on the same shaft 38 is a chain wheel 40 which carries a pusher pawl 41 co-operating with the ratchet wheel 39. The chain wheel 40 is connected by way of a chain 42 to a chain wheel 43 which is fixed relatively to the traction device 18. The diameters of the chain wheels 40 and 43 are made such that the travel of the starting carriage from position I to position III corresponds not entirely to one revolution of the chain wheel 40. Since about one and a half revolutions of the traction device 18 correspond to the travel of the starting cart 16, the chain wheel 40 is somewhat more than a third times larger than the chain wheel 43. The chain wheel 40 also carries a cam 44 which operates a switch 45 which disengages the clutch 19 when the starting cart 16 has reached position III.

As the measuring device for measuring a relative movement between carriage 6 and circulating cable 2 when the carriage 6 is coupled to the circulating cable 2 and to the starting cart 16, there can be used any known measuring device for example a device as proposed in Swiss patent specification 411,020. It is also possible to provide the running gear of the carriage with an auxiliary roller connected operatively to the circulating cable, the said auxiliary roller only having to transmit an indicating force and carrying out a rotational movement if the clamping mechanism slips on the circulating cable. A measuring device of this kind is described in German patent specification 523,924.

The testing apparatus described operates as follows. In the second phase of the starting operation, when the starting cart 16 has gone beyond position II, the carriage 6 is coupled both to the starting cart 16 and to the circulating cable 2, and the circulating cable 2 and the starting cable 20 are travelling synchronously, the cam wheel 36 has reached a position at which the control roller 33 abuts on the culmination point of the cam 37, the spring 32 having reached its extreme preloaded state. This operating position is designated as IV. On further rotation of the cam wheel 36, the control roller 33 under the action of the spring 32 jumps towards the bottom of the cam 37, the cam wheel 36 being rotated in free travel somewhat further, this operating position being designated as V. The sudden movement of the tensioning pulley 34 tensions the starting cable 20, and the carriage 6 by way of the starting cart 16 receives an impulse in the sense of an acceleration relatively to the circulating cable 2. If this impulse is greater than the gripping force of the clamping mechanism 7 of the circulating cable 2, a relative movement occurs between carriage 6 and circulating cable 2 which is measured by the measuring device. On attainment of the operating position VI the starting cable 20 is again relaxed, since with rotation of the point $18^1$ of the traction device beyond position V the effective radius of the traction device has decreased again. At the same time the cam 44 operates the switch 45, so that the clutch 19 is disengaged, the weight 26 draws the starting cart 16 back to position I, and the traction device 18 can follow this movement, since the chain wheel 40 freewheels on rotational movement in the counter-clockwise direction relatively to the cam wheel 36.

The impulse which the tensioning device 30–34 gives to the carriage 6 causes an additional longitudinal force only in the section of the circulating cable 2 which is situated between the clamping mechanism 7 and the cable pulley 1. Thus a testing apparatus is provided for testing the grip of a clamping mechanism of an overhead cableway carriage coupled to a circulating cable which substantially in no way prejudices the steady running of the circulating cable. A further advantage is that the existing satisfactory type of starting device represents an important part of this testing apparatus, so that only a very small number of simple parts are additionally required, and a very robust and reliable apparatus is obtained.

In the illustrated example of embodiment, the measuring device of the testing apparatus is so constructed that it measures the tractive force occurring in the starting cable 20 on operation of the tensioning device 30–34, a measured tractive force corresponding substantially to the tensioning force indicating the absence of any relative movement between the clamping mechanism 7 and the circulating cable 2.

The measuring device comprises a measuring pulley 47 carried by a link 46. The link 46 is connected to a spring 48 whose other end is connected to the common foundation supporting the link. The measuring pulley 47 is arranged at some spacing in the direction of travel of the circulating cable 2 from the end of the starting rail 15. It can thus take up the starting cable 20 coming from the starting cart 16 and guide it through a change of direction of 180°, whereupon it is passed by a guide pulley 49 to the pulley block 24, 25. The link 46 cooperates with a switch 50. A switch 51 operated by the starting cart 16 is arranged in accordance with position II and starts-up a timing mechanism which switches-off the driving device for the circulating cable 2 after a certain time.

The measuring device operates as follows. When the accelerated carriage 6 and the circulating cable 2 are running synchronously from the position II onwards, and the carriage 6 is coupled to the circulating cable 2 and to the starting cart 16, the tractive force to which the starting cable 20 is subjected is due primarily to friction and is negligibly slight for the following reasons. When the tensioning device 30–34 comes into action, there occurs in the starting cable 20 a tractive force between traction device 18 and starting cart 16, which is at a maximum when the clamping mechanism 7 adheres so satisfactorily to the circulating cable 2 that no relative movement occurs between these parts. The measuring pulley 47 is drawn to the left in opposition to the force of the spring 48 and when the tractive force reaches a predetermined value the link 46 operates the switch 50, whereby the timing mechanism started-up by the starting cart 16 by way of the switch 51 is reset again.

The measuring device described has the advantage that it is operated by the starting cable and consists of only a few parts and also stops the cableway if the tensioning device fails. Furthermore the working point of the tensioning and measuring devices can be regulated by varying the preloading of the springs 32 and 48 in a simple manner. A still simpler construction is obtained if the tensioning pulley 34 operates at the same time as a measuring pulley. If the grip of the clamping mechanism 7 on the circulating cable 2 is adequate, the control pulley 33 does not fall from the culmination point of the cam 37 entirely to the bottom of the cam, since the starting cable 20 is tensioned. On the other hand if the grip of the clamping mechanism is inadequate, the starting cable is not tensioned and the control pulley 33 falls to the bottom of the cam 37. Therefore the switch 50 can also be so arranged on the cam wheel 36 that it co-operates with the control pulley 33.

I claim:

1. In an overhead cableway having a circulating cable, carriages and a clamping mechanism for each of said carriages; a starting device for accelerating one of said carriages to the speed of said circulating cable; said starting device having a starting cart, a starting cable and a traction device; said starting cart being connected to said starting cable to be moved by said traction device; said traction device adapted to be coupled operatively to said circulating cable and so constructed as to move said one carriage accelerated by said starting device synchronously with said circulating cable; said accelerated carriage couplable to said circulating cable by said clamping mechanism; a testing apparatus comprising a measuring device for measuring relative movement between said carriage and said circulating cable; a tensioning device for tensioning said starting cable when said one carriage is coupled to said circulating cable and connected to said starting cart.

2. Overhead cableway according to claim 1, in which said measuring device is constructed as to measure the tractive force occurring on operation of said tensioning device in the starting cable.

3. Overhead cableway according to claim 2, in which said measuring device has a spring and a measuring element adapted to move in opposition to the force of said spring and subjected to the tractive force for said starting cable, the distance travelled by said measuring element being the measurement result.

4. Overhead cableway according to claim 2, in which said measuring device comprises a part of said tensioning device, the distance over which said part of said tensioning device acting on said starting cable travels being the measurement result.

5. Overhead cableway according to claim 1, in which said tensioning device comprises a preloaded spring, a cam wheel and a tensioning pulley; said cam wheel being driven by said traction device for accumulating force in said spring and releasing said force for moving said tensioning pulley against a section of said starting cable.

References Cited

UNITED STATES PATENTS

| 3,089,433 | 5/1963 | Carlevaro et al. | 104—204 |
| 3,416,462 | 12/1968 | Pomagalski | 104—204 |

ARTHUR L. LA POINT, Primary Examiner

R. SAIFER, Assistant Examiner

U.S. Cl. X.R.

104—162, 202; 105—148